(12) United States Patent
Tomita

(10) Patent No.: US 12,105,996 B2
(45) Date of Patent: Oct. 1, 2024

(54) METHOD FOR CONFIRMING CONNECTION TO CLOUD SERVICE

(71) Applicant: SHARP KABUSHIKI KAISHA, Sakai (JP)

(72) Inventor: Chikako Tomita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/511,697

(22) Filed: Nov. 16, 2023

(65) Prior Publication Data

US 2024/0176557 A1 May 30, 2024

(30) Foreign Application Priority Data

Nov. 25, 2022 (JP) .................................. 2022-187895

(51) Int. Cl.
*G06F 3/12* (2006.01)

(52) U.S. Cl.
CPC ............ *G06F 3/121* (2013.01); *G06F 3/1236* (2013.01); *G06F 3/1204* (2013.01)

(58) Field of Classification Search
None
See application file for complete search history.

(56) References Cited

U.S. PATENT DOCUMENTS

| 11,785,070 B2 * | 10/2023 | Daniel ................... H04L 67/02 709/203 |
| 2017/0180570 A1 * | 6/2017 | Hirasawa ........... H04N 1/00474 |
| 2018/0267755 A1 | 9/2018 | Okazawa |

FOREIGN PATENT DOCUMENTS

| JP | 2018-151981 A | 9/2018 |
| JP | 2020-123790 A | 8/2020 |

\* cited by examiner

*Primary Examiner* — Darryl V Dottin
(74) *Attorney, Agent, or Firm* — ScienBiziP, P.C.

(57) ABSTRACT

A method for confirming a connection to a cloud service, which is to be executed by an electronic device, includes: executing, when the electronic device is not connected to an available cloud service, a connection test between the electronic device and the cloud service at a predetermined timing; and notifying, when a connection between the electronic device and the cloud service fails in the connection test, an administrator and/or a user of an error from the electronic device.

7 Claims, 9 Drawing Sheets

METHOD FOR CONFIRMING CONNECTION TO CLOUD SERVICE

CROSS-REFERENCE TO RELATED APPLICATION

The present application claims priority from Japanese Application JP2022-187895, the content of which is hereby incorporated by reference into this application.

BACKGROUND OF THE INVENTION

1. Field of the Invention

The present disclosure relates to a method for confirming a connection to a cloud service.

2. Description of the Related Art

Cloud services that provide various services to users of electronic devices via a network are known. For example, in a cloud service that can be used in cooperation with an image processing device, a print job can be input to the image processing device via the cloud and executed, or data scanned by the image processing device can be managed by the cloud service that has cooperated with the image processing device. In such a network system, a conventional technique is known in which, when the inability of a terminal to make a network connection is detected, the diagnostic information is transmitted to an information processing device via another terminal in the vicinity of the terminal.

SUMMARY OF THE INVENTION

In general, when a cloud service is used from an image processing device, the image processing device is connected to the cloud service at a timing when a user wants to use the cloud service. At this time, the image processing device may not be able to be connected to the cloud service due to circumstances, for example, a change in information such as service content or a connection destination in the cloud service. A user who does not recognize such circumstances may receive a connection error even if the user attempts to use the cloud service, and may not be able to immediately use the service at a timing when the user wants to use the service.

According to the method of the conventional technique, an administrator of the information processing device (server) can recognize a network failure on the basis of the diagnostic information. On the other hand, for example, before using a cloud service provided by the server, a user of the terminal (client) cannot confirm whether the terminal can be connected to the cloud service. Therefore, this method has a low improvement effect on time loss or stress reduction of the user due to a poor connection to the cloud service.

It is an object of one mode of the present disclosure to provide a method for confirming a connection to a cloud service, which enables a user to use a cloud service at a timing when the user wants to use the cloud service.

One mode of the present disclosure is a method for confirming a connection to a cloud service, which is to be executed by an electronic device, including: executing, when the electronic device is not connected to an available cloud service, a connection test between the electronic device and the cloud service at a predetermined timing; and notifying, when a connection between the electronic device and the cloud service fails in the connection test, an administrator and/or a user of an error from the electronic device.

One mode of the present disclosure is a method for confirming a connection to a cloud service, which is to be executed by another electronic device connected to an electronic device, including: executing, when the electronic device is not connected to an available cloud service, a connection test between the electronic device and the cloud service at a predetermined timing; and notifying, when a connection between the electronic device and the cloud service fails in the connection test, an administrator and/or a user of an error from the another electronic device.

According to one mode of the present disclosure, a method for confirming a connection to a cloud service, which enables a user to use a cloud service at a timing when the user wants to use the cloud service can be provided.

DETAILED DESCRIPTION OF THE INVENTION

Figure 1:
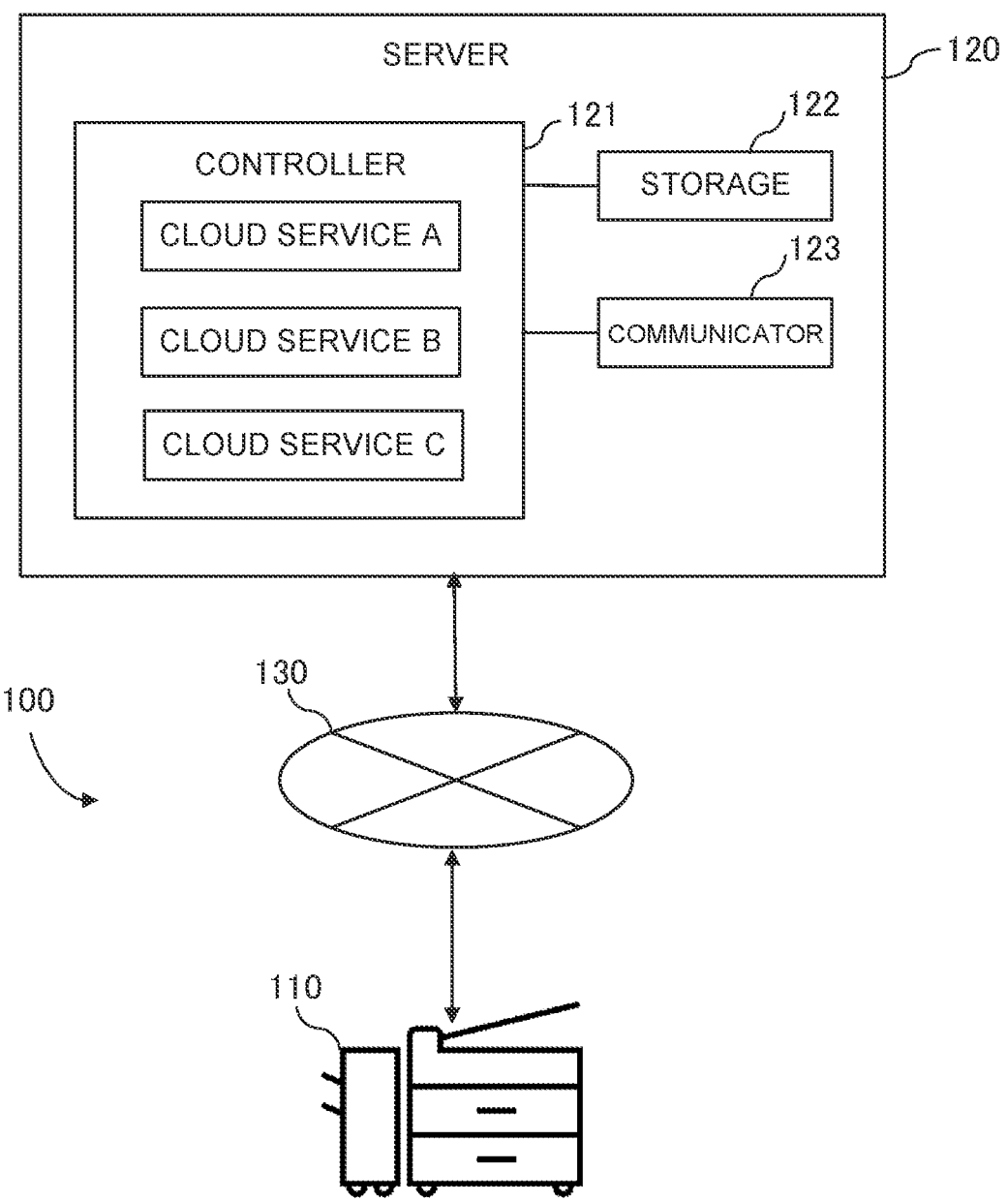
FIG. 1 is an overall configuration diagram of a cloud service provision system according to an embodiment.

Hereinafter, an embodiment of the present disclosure will be described with reference to the drawings. In the drawings, the same or equivalent elements are denoted by the same reference numerals, and duplicate explanations are omitted.

Figure 2:
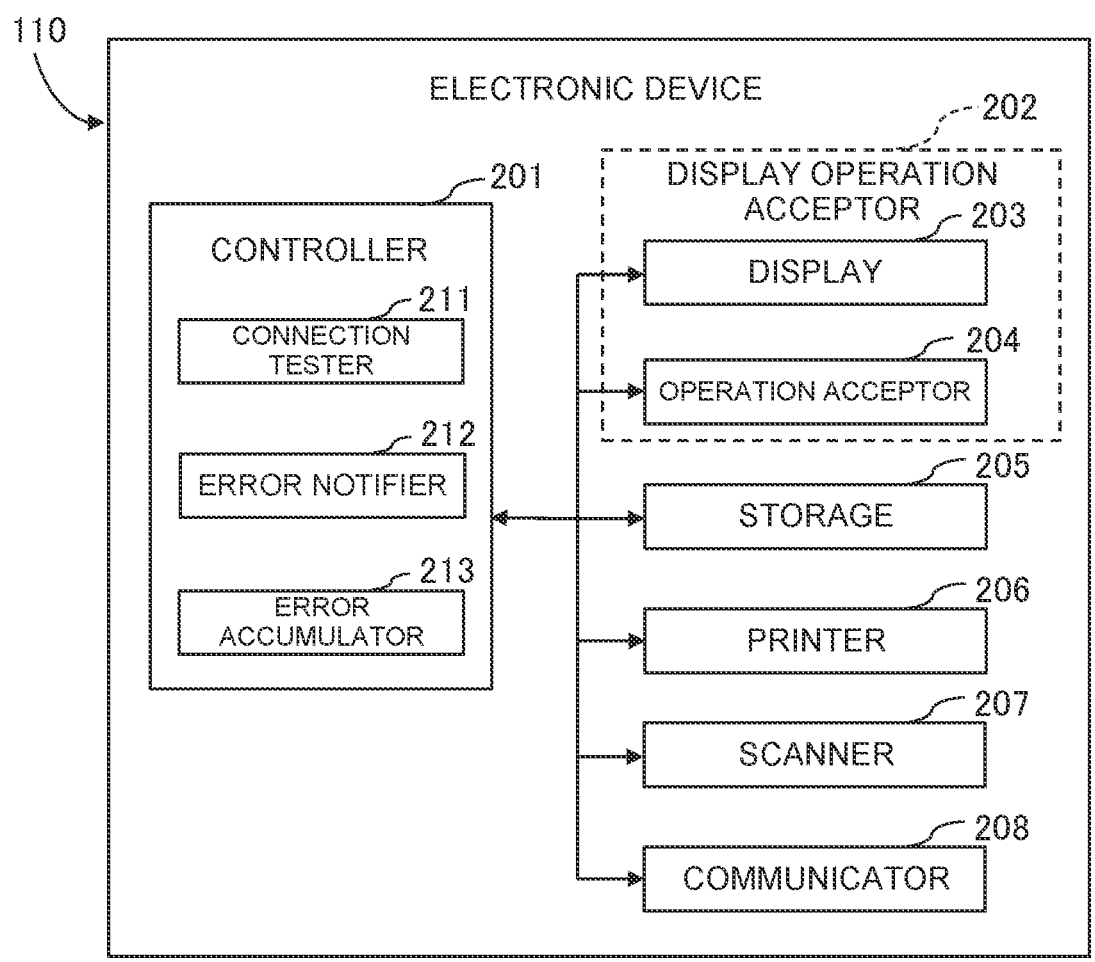
FIG. 2 is a block diagram illustrating an electrical configuration of an electronic device.

A configuration of a cloud service provision system 100 according to the embodiment will be described with reference to FIG. 1 and FIG. 2. FIG. 1 is an overall configuration diagram of the cloud service provision system 100 according to the embodiment. FIG. 2 is a block diagram illustrating an electrical configuration of an electronic device 110.

As illustrated in FIG. 1, the cloud service provision system 100 includes a server 120 that provides a cloud service and the electronic device 110 that can communicate with the server 120. In the present embodiment, an image processing device is exemplified as the electronic device 110. The image processing device is, for example, a multi-function peripheral installed in a store, such as a convenience store or a supermarket, or an office of a company, and can provide various services based on a copy function, a printer function, a scanner function, a facsimile function, and the like. The electronic device 110 and the server 120 are communicably connected to each other via a wired or wireless network 130.

The server 120 includes a controller 121, a storage 122, and a communicator 123. The controller 121 is a processor such as a central processing unit (CPU). The controller 121 may be a micro control unit (MCU) or a micro processor unit (MPU), or may be a field programmable gate array (FPGA), an application specific integrated circuit (ASIC), or another circuit having an arithmetic function. The storage 122 is a storage medium capable of storing various types of data, programs, and the like, and is, for example, a read only memory (ROM), a random access memory (RAM), a cache memory, a flash memory, or the like. The communicator 123 is a communication module that is connected to the network 130 to perform data communication.

In the present embodiment, at least one server 120 (for example, a plurality of servers 120 each providing a different cloud service) is provided in the cloud service provision system 100. Each server 120 can provide at least one cloud service to an electronic device serving as a client. Specifically, the controller 121 executes at least one cloud service on the basis of various types of data and programs stored in the storage 122. The controller 121 provides various services requested from the electronic device to the electronic device that has succeeded in being connected to the cloud service.

In the server 120 illustrated in FIG. 1, the controller 121 can provide three cloud services A to C to the electronic device 110 serving as a client. For example, the cloud service A provides a "Scan to Cloud" service in which image data of a document scanned by the electronic device 110 is stored on the cloud side. The cloud service B provides a "Print from Cloud" service in which a print job of image data stored on the cloud side is input to the electronic device 110 and printing is performed.

As illustrated in FIG. 2, the electronic device 110 includes a controller 201, a display operation acceptor 202, a storage 205, a printer 206, a scanner 207, and a communicator 208. The controller 201 is a processor such as a CPU, but may be an MCU or an MPU, or may be a circuit having an arithmetic function.

The display operation acceptor 202 includes a display 203 and an operation acceptor 204, and is a touch panel display in the present embodiment. The display 203 is a liquid crystal display, an organic EL display, or the like, and displays various images. The operation acceptor 204 is a touch panel arranged to overlap the display 203, and receives a user's touch operation. The display 203 and the operation acceptor 204 may be separately provided in the display operation acceptor 202.

The storage 205 is a device capable of storing programs and data, and is, for example, a ROM, a RAM, a cache memory, a flash memory, or the like. The printer 206 prints designated image data on a paper sheet fed from one of a plurality of paper trays, and discharges the printed paper sheet to a paper discharge port. The scanner 207 reads a document placed on a document table, and generates image data of the read document. The communicator 208 is a communication module that is connected to the network 130 to perform data communication.

In the electronic device 110, the controller 201 executes a program in the storage 205 to implement various functional blocks. The functional blocks include a connection tester 211, an error notifier 212, and an error accumulator 213. When the electronic device is not connected to an available cloud service, the connection tester 211 executes a connection test between the electronic device and the cloud service at a predetermined timing. When the connection between the electronic device and the cloud service fails in the connection test, the error notifier 212 notifies an administrator and/or a user of an error from the electronic device. When the connection between the electronic device and the cloud service fails in the connection test, the error accumulator 213 accumulates history data indicating the connection failure.

Figure 3:
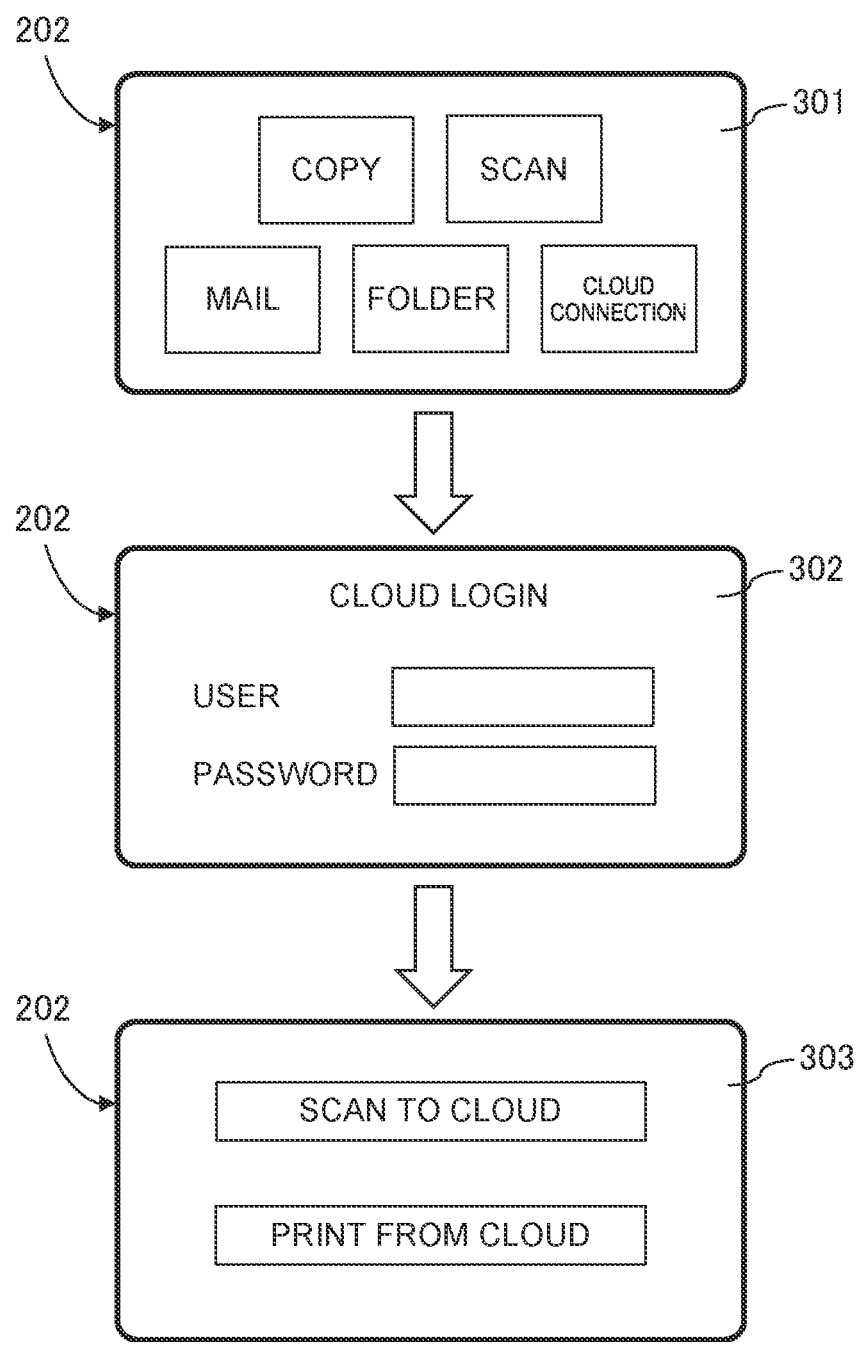
FIG. 3 is an example of a screen to be displayed on the electronic device.
Figure 4:
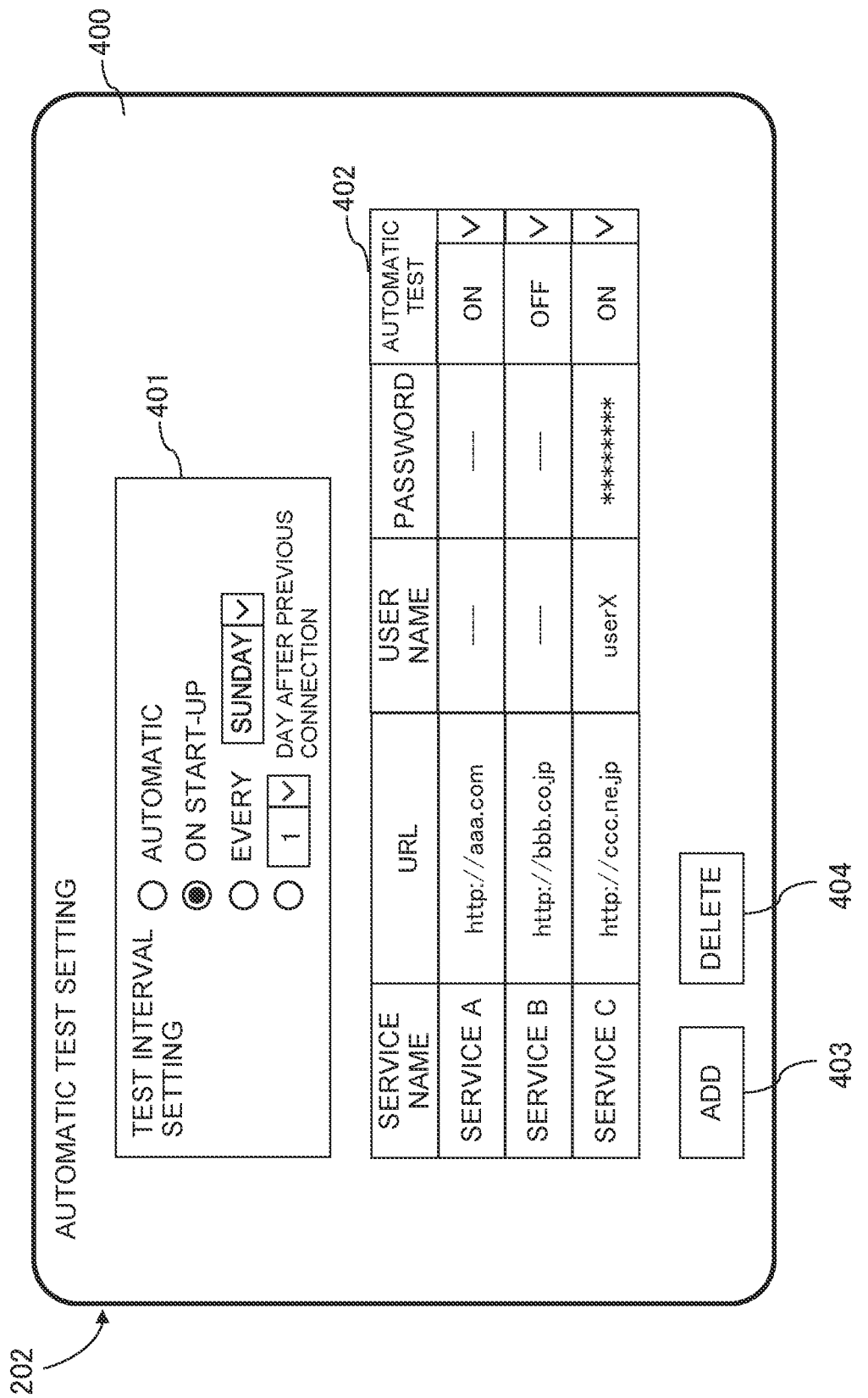
FIG. 4 is a screen example of a test setting screen.
Figure 5:
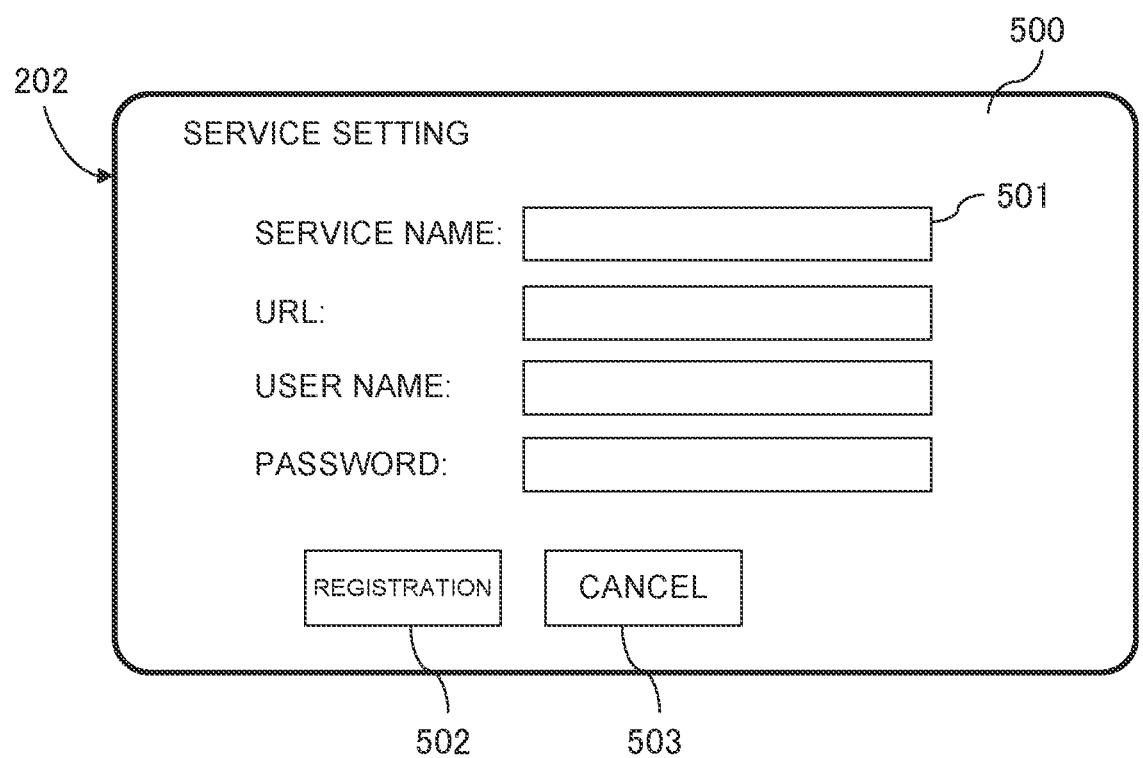
FIG. 5 is a screen example of a service setting screen.

A flow until the user receives the cloud service in the electronic device 110 will be described with reference to FIG. 3 to FIG. 5. FIG. 3 is an example of a screen to be displayed on the electronic device 110. FIG. 4 is a screen example of a test setting screen. FIG. 5 is a screen example of a service setting screen.

As illustrated in FIG. 3, a home screen 301 is displayed first on the display operation acceptor 202 of the electronic device 110. A plurality of icons corresponding to various services (copy, scan, mail, folder, cloud connection, and the like) which can be provided by the electronic device 110 are displayed on the home screen 301. The user selects an icon of a service that the user wants to use from the home screen 301 by a touch operation.

In this example, among the various services displayed on the home screen 301, mail, folder, and cloud connection are cloud services. Furthermore, users who can use the mail and folder cloud services in this example are not limited. Therefore, the user can receive the provision of the selected cloud service by selecting the icon of "mail" or "folder" on the home screen 301 by a touch operation.

On the other hand, when the user wants to use a cloud service that users who can use are limited, the user selects the icon of "cloud connection" on the home screen 301 by a touch operation. In this case, a user authentication screen 302 is displayed on the display operation acceptor 202 to prompt the user to input a user name and a password. When user authentication based on the user name and the password input to the user authentication screen 302 succeeds, a cloud selection screen 303 is displayed on the display operation acceptor 202.

Icons corresponding to cloud services which can be provided by the electronic device 110 are displayed on the cloud selection screen 303. The user selects an icon of a cloud service that the user wants to use from the cloud selection screen 303 by a touch operation. As a result, the electronic device 110 is connected to the selected cloud service, and executes a service provided by the cloud service.

The electronic device 110 may not be able to be connected to the cloud service due to circumstances, such as a change in information such as service content or a connection destination in the cloud service, the server 120 not operating due to maintenance or a failure, or a defect in a network setting or a communication cable of the electronic device 110, for example. In this case, even when the cloud service is selected on the cloud selection screen 303, the electronic device 110 cannot be connected to the cloud service. In other words, since the cloud service cannot be used at a timing when the user wants to use the cloud service, time loss or stress of the user may occur.

As described below, in the present embodiment, the connection tester 211 automatically executes, at a predetermined timing before the use of the cloud service is started, a connection test that confirms in advance whether the electronic device 110 can be connected to the cloud service. The administrator of the electronic device 110 can freely set the cloud service to be a target of the connection test and the confirmation timing to execute the connection test.

For example, when the administrator performs a predetermined touch operation on the home screen 301, a test setting screen 400 illustrated in FIG. 4 is displayed on the display operation acceptor 202. The test setting screen 400 includes a test interval setting field 401, a service setting field 402, an add button 403, and a delete button 404.

The test interval setting field 401 is an area for the administrator to freely set an interval at which the connection test is executed (hereinafter referred to as "test interval"). In the test interval setting field 401 of FIG. 4, the administrator can select an option to be set as the test interval from among options of "automatic," "on start-up," "every X day," and "X day(s) after previous connection" by a radio button.

When "automatic" is set as the test interval, the connection tester 211 automatically sets the test interval and executes the connection test. In the present embodiment, the connection tester 211 counts the number of times that each cloud service is used in the electronic device 110, and sets a shorter test interval for a cloud service having a higher usage frequency. For example, for a cloud service that is used every day, the test interval is set to once every day. For a cloud service that is used a few times a month, the test interval is set to once every week.

Moreover, when the test interval is "automatic," the connection tester 211 may execute the connection test of a cloud service whose usage frequency is a threshold value or more (for example, once a day) every time the electronic device 110 is started up. When a cloud service has not been used for a predetermined number of days (for example, five days), the connection tester 211 may execute the connection test of the cloud service. The connection tester 211 may learn a usage history of each cloud service in the electronic device 110 and execute the connection test at a timing before a predicted date and time when each cloud service is used next time.

When "on start-up" is set as the test interval, the connection tester 211 executes the connection test every time the electronic device 110 is started up. When "every X day" is set as the test interval, the connection tester 211 executes the connection test every X day. In this case, in order to suppress the load of the server 120, the connection test may be executed at a random time on X day. When "X day(s) after previous connection" is set as the test interval, the connection tester 211 executes the connection test every time X day(s) have elapsed since the previous connection test.

The service setting field 402 is an area for the administrator to freely set a cloud service to be a target of the connection test. In the service setting field 402, "service name" and "URL" are set for each cloud service. Furthermore, for a cloud service that requires user authentication, "user name" and "password" are set as authentication information for using the cloud service. The administrator can selectively set ON or OFF of "automatic test" of each cloud service in the service setting field 402. The connection tester 211 executes the connection test on a cloud service for which "automatic test" is ON among the cloud services set in the service setting field 402.

Although the case in which the electronic device 110 is connected to the cloud service by accessing the URL set by the administrator has been illustrated above, the electronic device 110 may be connected to the cloud service by an embedded application of the electronic device 110. Since the embedded application internally holds the URL of the cloud service, the administrator does not need to set the URL. In this case, in order to execute the connection test of the cloud service based on the embedded application, the embedded application may be set in the service setting field 402. In the service setting field 402, while "automatic test" is displayed corresponding to the set embedded application, "URL," "user name," and "password" are not displayed. The administrator can execute the connection test of the optional embedded application by selectively setting ON or OFF of "automatic test" corresponding to the embedded application.

The administrator can add a new cloud service to the service setting field 402 by pressing the add button 403. Specifically, when the administrator presses the add button 403, a service setting screen 500 illustrated in FIG. 5 is displayed on the display operation acceptor 202. The service setting screen 500 includes a service input field 501, a registration button 502, and a cancel button 503.

The service input field 501 is an area for the administrator to input information about a new cloud service. The administrator inputs at least "service name" and "URL" of the new cloud service in the service input field 501. Furthermore, when the new cloud service requires user authentication, the administrator inputs "user name" and "password" as authentication information. The authentication information may be "user name" and "password" with the privilege of the administrator, or "user name" and "password" with the privilege of the user who actually uses the cloud service.

Then, when the administrator presses the registration button 502, the display screen of the display operation acceptor 202 returns to the test setting screen 400, and the new cloud service input in the service input field 501 is added to the service setting field 402. On the other hand, when the administrator presses the cancel button 503, the information input in the service input field 501 is discarded, and the display screen of the display operation acceptor 202 returns to the test setting screen 400. When the administrator wants to delete an unnecessary cloud service from the service setting field 402, the administrator may select the unnecessary cloud service and press the delete button 404.

The test interval set in the test interval setting field 401 and the cloud services set in the service setting field 402 are stored in the storage 205. In the present embodiment, since one test interval is set for all the cloud services as described above, the connection tests of all the cloud services are executed at the same timing on the basis of the test interval. Alternatively, a test interval may be set for each cloud service, and the connection test of each cloud service may be executed at an individual timing on the basis of the corresponding test interval.

Although the case in which the cloud service to be tested and the test interval are set in the electronic device 110 has been described in the above example, the cloud service to be tested and the test interval may be set in an external device (for example, a PC or a smartphone) connected to the electronic device 110.

Figure 6:
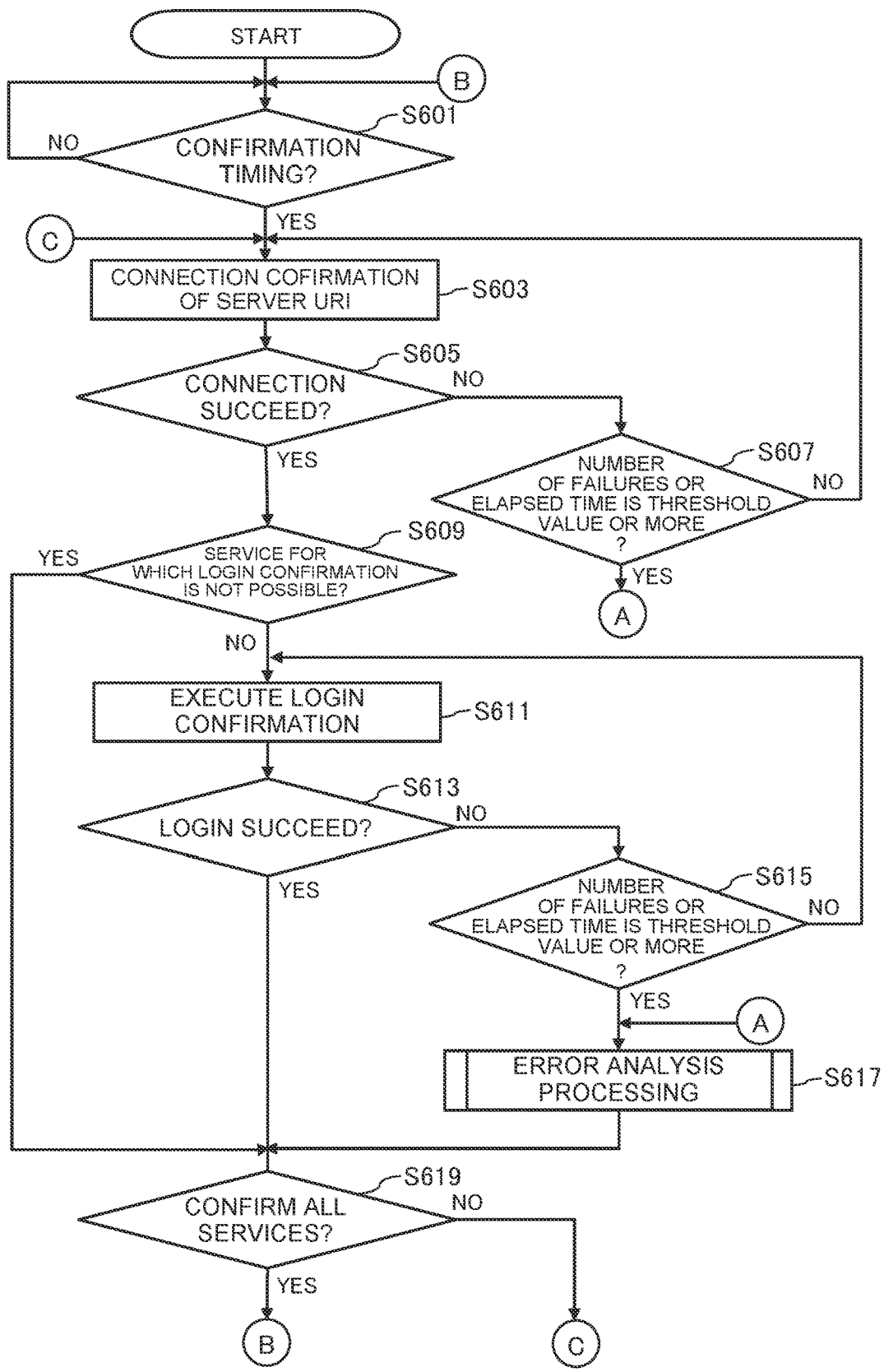
FIG. 6 is a flowchart of connection confirmation processing to be executed by the electronic device.
Figure 7:
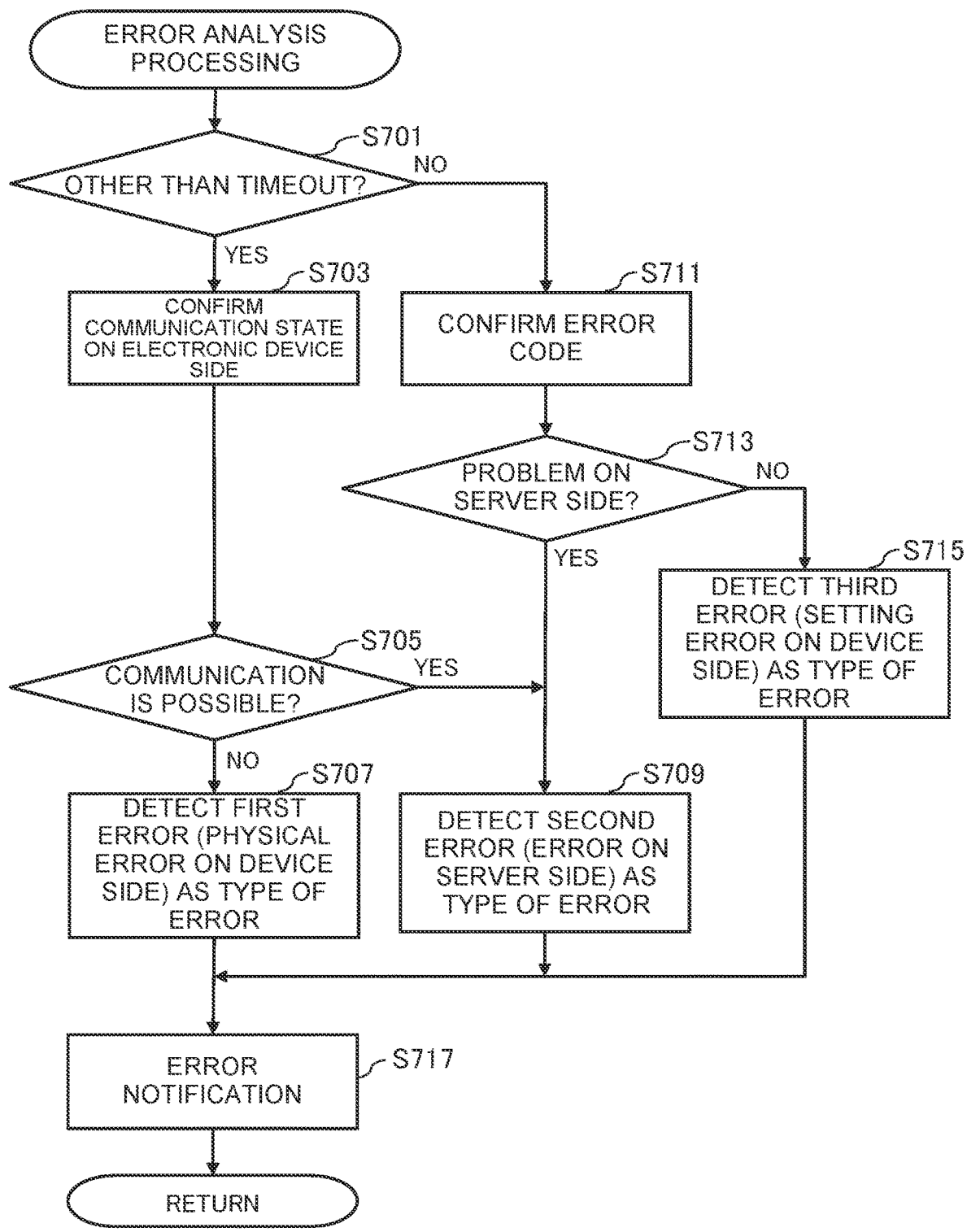
FIG. 7 is a flowchart of error analysis processing.

Hereinafter, among various types of processing to be executed by the cloud service provision system 100 of the present embodiment, processing that relates to a connection test of a cloud service will be described. FIG. 6 is a flowchart of connection confirmation processing to be executed by the electronic device 110. FIG. 7 is a flowchart of error analysis processing.

The connection confirmation processing will be described with reference to FIG. 6. In the connection confirmation processing, when the electronic device 110 is not connected to an available cloud service, a connection test between the electronic device 110 and the cloud service is executed at a predetermined timing.

As illustrated in FIG. 6, in S601, the connection tester 211 determines whether it is a confirmation timing to execute the connection test on the basis of the test interval stored in the storage 205. When it is not the confirmation timing, the connection tester 211 returns the processing to S601 and waits for the arrival of the confirmation timing.

In the case of the confirmation timing, in S603, the connection tester 211 executes connection confirmation of a server uniform resource identifier (URI). Specifically, the connection tester 211 attempts to connect each cloud service to be tested to the URL. The cloud service to be tested is a cloud service for which "automatic test" is set to ON and which is not connected to the electronic device 110 among the cloud services stored in the storage 205.

In the example of FIG. 4, "automatic test" is set to ON for "service A" and "service C" among the three cloud services set in the service setting field 402. When "service A" and "service C" are not connected to the electronic device 110 at the time of the arrival of the confirmation timing, "service A" and "service C" are handled as cloud services to be tested in processing after S603. Therefore, for example, when the electronic device 110 is already connected in order to use "service A" at the time of the arrival of the confirmation timing, the connection confirmation of "service A" is not executed in S603.

In S605, the connection tester 211 determines whether the connection to the cloud service to be tested succeeds. For example, in the connection confirmation of S603, the connection tester 211 transmits a connection request to the URL of the cloud service, and waits for a normal response from the cloud service for a predetermined waiting time (for example, 10 seconds or 20 seconds). When there is no normal response from the cloud service within the waiting time (for example, when a timeout occurs or an abnormal response is received), the connection tester 211 determines that the connection to the cloud service to be tested fails.

In this case, in S607, the connection tester 211 determines whether the number of connection failures or an elapsed time from the start of the test is a threshold value or more. For example, the threshold value of the number of connection failures is five, and the threshold value of the elapsed time from the start of the test is 60 minutes. When both the number of connection failures and the elapsed time from the start of the test are less than the threshold values, the connection tester 211 returns the processing to S603 and retries the connection confirmation for the cloud service for which the connection fails.

When the connection confirmation of S603 is retried many times at certain time intervals, the cloud service side may erroneously recognize that unauthorized access has been received by, for example, a robot or a third party. In the present embodiment, when the connection confirmation is retried in S603, new connection confirmation is executed at a random time interval (for example, an interval of about 5 minutes to 15 minutes) from the previous connection confirmation.

When the number of connection failures or the elapsed time from the start of the test is the threshold value or more, the connection tester 211 determines that a connection error to the cloud service occurs, and advances the processing to the error analysis processing of S617. Details of the error analysis processing will be described below.

When a normal response is received within the waiting time in S605, the connection tester 211 determines that the connection to the cloud service to be tested succeeds. In this case, in S609, the connection tester 211 determines whether the cloud service to be tested is a cloud service for which login confirmation is not possible.

The cloud service for which login confirmation is not possible is a cloud service that does not have a function of automatically executing user authentication with the electronic device 110. For example, a cloud service that does not require login confirmation or a cloud service that causes a user to input authentication information (a user name and a password) for login confirmation each time is the cloud service for which login confirmation is not possible. In the example of FIG. 4, when the cloud service to be tested is "service A" that does not require user authentication, in S609, it is determined to be the cloud service for which login confirmation is not possible. In this case, the connection tester 211 shifts the processing to S619 described below.

Moreover, for example, when a login application programming interface (API) is provided to the cloud service to be tested, the cloud service can automatically execute login confirmation with the electronic device 110 even when authentication information is not input by the user. In the example of FIG. 4, when the cloud service to be tested is "service C" that requires user authentication and the login API is provided to the cloud service, in S609, it is determined not to be the cloud service for which login confirmation is not possible.

In this case, the connection tester 211 executes login confirmation with the cloud service to be tested in S611, and determines whether a login succeeds in S613. Specifically, the connection tester 211 provides authentication information of the cloud service to be tested, which is stored in the storage 205, to the cloud service of the connection destination through the login API. On the cloud service side, user authentication is executed on the basis of the authentication information provided from the electronic device 110, and the electronic device 110 is notified of whether or not the connection to the cloud service is possible.

When the electronic device 110 is notified of connection permission from the cloud service, the connection tester 211 determines that the login succeeds, and shifts the processing to S619. On the other hand, when the electronic device 110 is notified of connection rejection from the cloud service, the connection tester 211 determines that the login fails. As described above, authentication processing based on the authentication information provided from the electronic device 110 to the cloud service is performed in the connection test, and the connection to the cloud service is rejected when the authentication processing fails.

When the login fails in S613, in S615, the connection tester 211 determines whether the number of login failures or an elapsed time from the start of the test is a threshold value or more, as is the case with S607. When both the number of login failures and the elapsed time from the start of the test are less than the threshold values, the connection tester 211 returns the processing to S611 and retries the login confirmation for the cloud service for which the login fails.

When the number of login failures or the elapsed time from the start of the test is the threshold value or more, the connection tester 211 determines that a connection error to the cloud service occurs, and advances the processing to the error analysis processing of S617. After executing the error analysis processing, the connection tester 211 shifts the processing to S619.

In S619, the connection tester 211 determines whether the connection confirmation of S603 is executed for all the cloud services to be tested, which are stored in the storage 205. When the connection confirmation is executed for all the cloud services to be tested, the connection tester 211 ends the connection test, returns the processing to S601, and waits for a next confirmation timing.

On the other hand, when there is an unprocessed cloud service for which the connection confirmation is not executed, the connection tester 211 returns the processing to S603, executes the connection confirmation for the unprocessed cloud service, and repeats the above-described processing. As described above, in the present embodiment, when a plurality of cloud services to be tested are set in the electronic device 110, the connection tests of the cloud services are sequentially executed. Alternatively, the connection tests of the cloud services may be executed simultaneously in parallel.

The error analysis processing will be described with reference to FIG. 7. In the error analysis processing, when the connection between the electronic device 110 and the cloud service fails in the connection test, the administrator and/or the user is notified of an error from the electronic device 110. Moreover, the type of the error is detected, and the administrator and/or the user is notified of the type of the error from the electronic device 110.

As illustrated in FIG. 7, in S701, the error notifier 212 determines whether the cause of the connection failure or the login failure for the cloud service to be tested (in other words, the cause of the failure in the connection test) is other than the timeout. When the cause of the failure in the connection test is other than the timeout, in S703, the error notifier 212 confirms a communication state on the side of the electronic device 110. Specifically, the error notifier 212 confirms a device state such as cable connection or wireless connection in the electronic device 110. In S705, the error notifier 212 determines whether the electronic device 110 can communicate with the network on the basis of the confirmation result.

When the electronic device 110 cannot communicate with the network, in S707, the error notifier 212 detects a first error as the type of the error. The first error is the type of the error indicating that there is a problem in the device state of the electronic device 110. On the other hand, when the electronic device 110 can communicate with the network, in S709, the error notifier 212 detects a second error as the type of the error. The second error is the type of the error indicating that there is a problem on the side of the server 120 that provides a cloud service.

When the cause of the failure in the connection test is the timeout, in S711, the error notifier 212 confirms an error code returned from the cloud service side. In S713, the error notifier 212 determines whether the confirmed error code indicates a problem on the server side.

For example, the error notifier 212 confirms a HTTP status code returned from the cloud service side which fails in the connection test as the error code. At this time, when the HTTP status code is mainly in the 500s, the error notifier 212 determines that the error code indicates a problem on the server side. Moreover, when the login API is provided to the cloud service which fails in the connection test, the error notifier 212 confirms a return value of the login API as the error code. When the return value of the login API relates to an error on the server side, the error notifier 212 determines that the error code indicates a problem on the server side. In these cases, in S709, the error notifier 212 detects a second error as the type of the error.

On the other hand, when the HTTP status code returned from the cloud service side which fails in the connection test is mainly in the 400s, and when the return value of the login API relates to an error on the client side, the error notifier 212 determines that the error code indicates a problem on the client side. In these cases, in S715, the error notifier 212 detects a third error as the type of the error. The third error is the type of the error indicating that there is a problem in setting content of the electronic device 110 (for example, a connection setting to the server or information regarding the cloud services illustrated in FIG. 4).

Figure 8A:
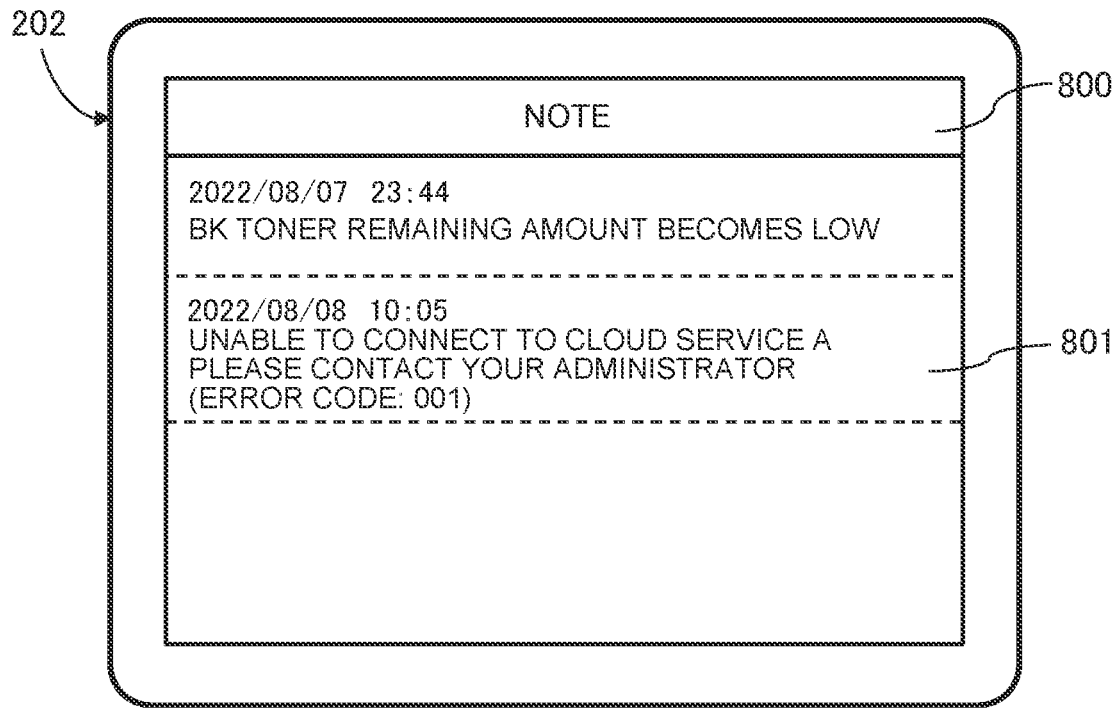
FIG. 8A is a screen example of a system information screen on which an error notification is executed.
Figure 8B:
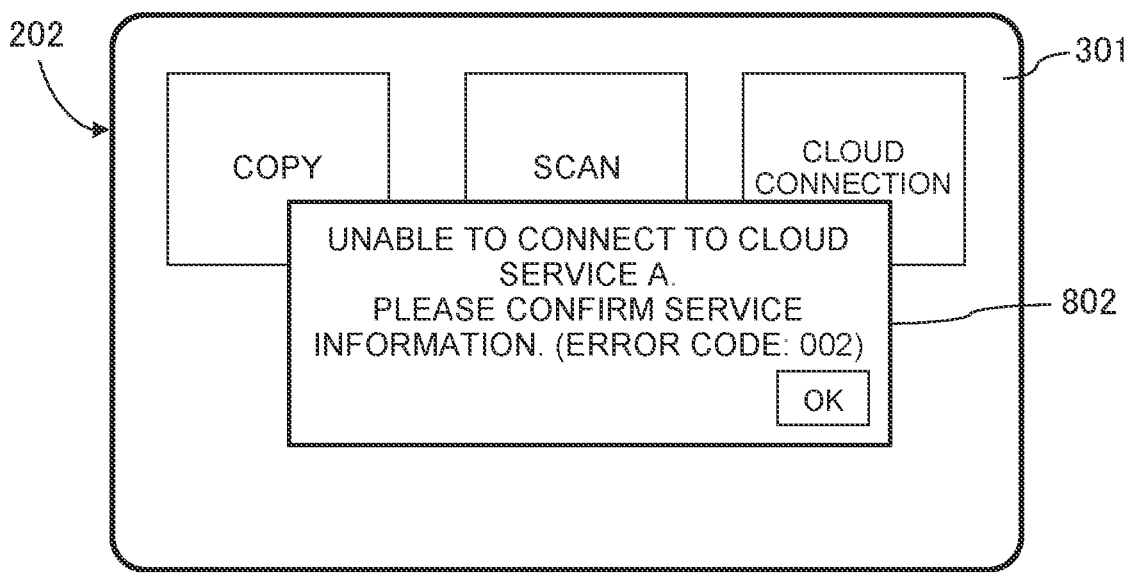
FIG. 8B is a screen example of a home screen on which the error notification is executed.

After any one of S707, S709, and S715 is executed, in S717, the error notifier 212 notifies the administrator and/or the user of an error. The error notification can be executed in various modes as described below. FIG. 8A is a screen example of a system information screen 800 on which the error notification is executed. FIG. 8B is a screen example of the home screen 301 on which the error notification is executed.

In the electronic device 110, the system information screen 800 illustrated in FIG. 8A is displayed on the display operation acceptor 202 in response to a screen operation by the administrator and/or the user. The system information screen 800 is a screen for notifying the administrator and/or the user of a status, an event, or the like of the electronic device 110, and, for example, a list of messages indicating the status, the event, or the like is displayed in chronological order.

In S717, the error notifier 212 may display a notification message of the error on the system information screen 800. In the example of FIG. 8A, a notification message 801 of the error is added to the system information screen 800 as the latest message. The message 801 indicates unable to connect to the cloud service A, "Please contact your administrator" as a countermeasure, and "Error Code: 001" indicating that the type of the error is the first error.

In S717, the error notifier 212 may display a notification message of the error on the home screen 301. In the example of FIG. 8B, a notification message 802 of the error is displayed on the home screen 301 as a pop-up. The message 802 indicates unable to connect to the cloud service A, "Please confirm service information" as a countermeasure, and "Error Code: 002" indicating that the type of the error is the second error.

As described above, when the connection between the electronic device 110 and the cloud service fails in the connection test, the notification message of the error is displayed on the display 203 of the electronic device 110. In S717, the error notifier 212 may notify the administrator and/or the user of the notification message of the error by e-mail or the like instead of displaying the notification message of the error on the screen as described above.

As described above, in the cloud service provision system 100, at a stage before the user uses the cloud service in the electronic device 110, whether the cloud service is in a connectable state is confirmed in advance, and the error notification is executed when the cloud service is not connectable. As a result, the user can be prevented from performing an operation to connect to the cloud service that is not connectable, and time loss or stress of the user can be suppressed. Moreover, by prompting the administrator to deal with the connection error before the user uses the cloud service that is not connectable, the user can smoothly use the cloud service.

Instead of executing the error notification at the timing when the connection test fails as described above, the error notifier 212 may execute the error notification at a timing different from the timing when the connection test fails. For example, when the connection between the electronic device 110 and the cloud service fails in the connection test, the administrator and/or the user may be notified of the error at a timing when logging into the electronic device 110.

Furthermore, the error notifier 212 may change the timing of the error notification depending on the type of the error. For example, when the type of the error is the first error, the device state of the electronic device 110 needs to be corrected so as to resolve the error. When the administrator having the privilege of correcting the device state of the electronic device 110 and/or the user logs into the electronic device 110, the error notifier 212 may execute the error notification.

Moreover, when the type of the error is the second error, the error notification may be executed when the administrator having the privilege of inquiring of an operator of the cloud service or the server 120 and/or the user who has a usage history of the cloud service logs into the electronic device 110. When the type of the error is the third error, the error notification may be executed when the administrator having the privilege of changing the setting content of the electronic device 110 and/or the user who has a usage history of the cloud service logs into the electronic device 110.

Figures 9, 10:
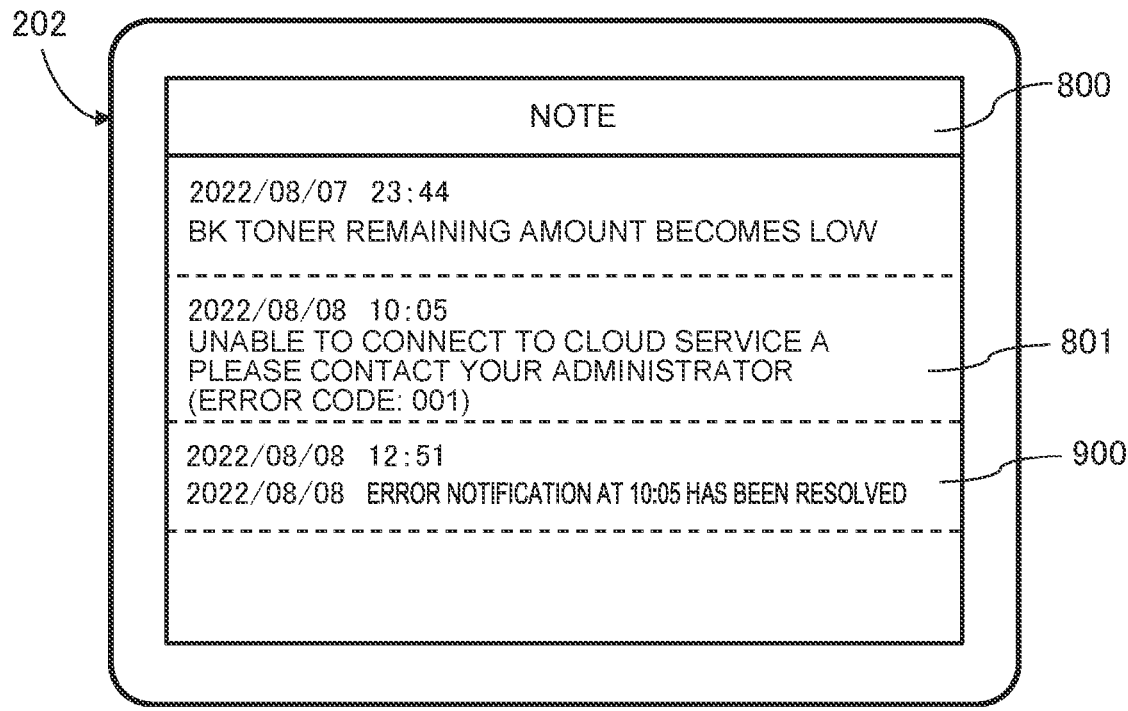
FIG. 9 is a screen example of the system information screen on which an error resolution notification is executed.
FIG. 10 is a diagram illustrating a data configuration of an error history table.

When the cloud service that has failed in connection to the electronic device 110 in the previous connection test succeeds in connection to the electronic device 110 in the current connection test, the administrator and/or the user may be notified of a resolution of the error from the electronic device 110. FIG. 9 is a screen example of the system information screen 800 on which an error resolution notification is executed.

For example, it is assumed that the notification message 801 of the connection error of the cloud service A is added to the system information screen 800 as illustrated in FIG. 8A, and then, the connection test of the cloud service A succeeds. At this time, as illustrated in FIG. 9, the error notifier 212 cancels the error notification of the message 801 by adding a message 900 indicating the resolution of the connection error of the cloud service A to the system information screen 800. Moreover, the error notifier 212 may cancel the error notification of the message 801 by deleting the message 801 from the system information screen 800.

Moreover, when the notification message of the connection error of the cloud service A is received by e-mail or the like, and then, the connection test of the cloud service A succeeds, the error notifier 212 may notify the administrator and/or the user of the message indicating the resolution of the connection error of the cloud service A by e-mail or the like.

When the cloud service that has failed in connection to the electronic device 110 in the previous connection test succeeds in connection to the electronic device 110 in the current connection test, the notification message of the error may be deleted from the display operation acceptor 202. For example, it is assumed that the notification message 802 of the connection error of the cloud service A is displayed on the home screen 301 as a pop-up as illustrated in FIG. 8B, and then, the connection test of the cloud service A succeeds. At this time, the error notifier 212 cancels the error notification of the message 802 by deleting the message 802 from the home screen 301.

The connection tester 211 may repeatedly execute the connection tests at a predetermined period of time (for example, 0 a.m.) on different days. When a plurality of connection tests are executed at the predetermined period of time on days different from each other as described above, if the connection between the electronic device 110 and the cloud service fails and the detected type of the error is the same in each of the plurality of connection tests, the connection tests may be executed at a period of time different from the predetermined period of time. FIG. 10 is a diagram illustrating a data configuration of an error history table 1000.

For example, every time the connection test fails, the error accumulator 213 registers history data about the connection error in the error history table 1000 stored in the storage 205. As illustrated in FIG. 10, in the error history table 1000, history data is stored in chronological order for each connection error detected in the connection test. The history data includes a date and time of the error, a service name, a URL, and the type of the error.

In the example of FIG. 10, the connection tests of the cloud service A are executed at the same period of time (10:00 a.m.) on Aug. 8 and Aug. 9, 2022, and connection errors caused by the same first error (error code: 001) are detected in both connection tests. When the same type of the error is detected in the connection tests at the same period of time on different days as described above, there is a possibility that an obstructive factor (for example, a maintenance period or an access concentration period in the server 120) specific to the period of time exists.

For example, when the connection test of the cloud service A is executed again on Aug. 10, 2022, the connection tester 211 executes the connection test at a period of time (for example, 3:00 p.m.) different from that of the previous connection test. As a result, a new connection test can be executed for the cloud service A while the obstructive factor specific to the period of time is avoided.

In the example of FIG. 10, the connection tests of the cloud service B are executed at the same period of time (10:00 p.m.) on Aug. 8 and Aug. 9, 2022, and connection errors are detected in both connection tests. However, since the types of the detected errors are different from each other in the connection test on August 8 and the connection test on August 9, there is a low possibility that the connection errors occur due to the obstructive factor specific to the period of time. Therefore, for example, when the connection test of the cloud service B is executed again on Aug. 10, 2022, the connection test may be executed at the same period of time (10:00 p.m.) as that of the previous connection test.

The present disclosure is not limited to the above-described embodiments, and various modifications can be made within the scope of the claims. An embodiment that can be implemented by appropriately combining technical means disclosed in the different embodiments also falls within the technical scope of the present disclosure. Furthermore, new technical features can be formed by combining the technical means disclosed in the embodiments.

For example, although the case in which the functional blocks such as the connection tester 211, the error notifier 212, and the error accumulator 213 are provided in the electronic device 110 has been illustrated in the above embodiment, a part or all of these functional blocks may be provided in another electronic device (for example, a PC of the administrator, a maintenance terminal, or the server 120) connected to the electronic device 110. In this case, a part or all of the processing described in the above embodiment are executed by another electronic device connected to the electronic device 110, and the processing load of the electronic device 110 can be reduced. In other words, the connection test may be executed by another electronic device, but the error notification may be executed by the electronic device 110, or the whole processing may be executed by another electronic device.

What is claimed is:

1. A method performed by an electronic device for confirming a connection to a cloud service, the method comprising:

executing, when the electronic device is not connected to a cloud service, a connection test between the electronic device and the cloud service during a predetermined period of time; and notifying, when a connection between the electronic device and the cloud service fails in the connection test, an administrator and/or a user of an error by the electronic device, wherein, when the connection between the electronic device and the cloud service fails in the connection test, a type of the error is detected, and the administrator and/or the user is notified of the type of the error by the electronic device, and a plurality of connection tests, including the connection test, is executed at a period of time different from the predetermined period of time when:

the plurality of connection tests is executed at the predetermined period of time on different days, and the connection between the electronic device and the cloud service in the plurality of connection tests fails and the type of the error is the same in each of the plurality of connection tests.

2. A method performed by a first electronic device for confirming a connection between a second electronic device and a cloud service, the method comprising:

executing, when the second electronic device is not connected to a cloud service, a connection test between the second electronic device and the cloud service during a predetermined period of time; and notifying, when a connection between the second electronic device and the cloud service fails in the connection test, an administrator and/or a user of an error by the first electronic device, wherein, when the connection between the second electronic device and the cloud service fails in the connection test, a type of the error is detected, and the administrator and/or the user is notified of the type of the error by the first electronic device, and a plurality of connection tests, including the connection test, is executed at a period of time different from the predetermined period of time when:

the plurality of connection tests is executed at the predetermined period of time on different days, and the connection between the second electronic device and the cloud service in the plurality of connection tests fails and the type of the error is the same in each of the plurality of connection tests.

3. The method according to claim 1, wherein the electronic device stores authentication information for using the cloud service, authentication processing based on the authentication information provided from the electronic device to the cloud service is performed in the connection test, and the connection to the cloud service is rejected when the authentication processing fails.

4. The method according to claim 1, wherein, when the connection between the electronic device and the cloud service fails in the connection test, a notification message of the error is displayed on a display of the electronic device.

5. The method according to claim 1, wherein, when the connection between the electronic device and the cloud service fails in the connection test, the administrator and/or the user is notified of the error at a time of logging into the electronic device.

6. The method according to claim 4, wherein, when the cloud service, that has failed in a previous connection to the electronic device in a previous connection test, succeeds in the connection to the electronic device in the connection test, the notification message of the error is deleted from the display.

7. The method according to claim 1, wherein, when the cloud service, that has failed in a previous connection to the electronic device in a previous connection test, succeeds in the connection to the electronic device in the connection test, the administrator and/or the user is notified of a resolution of the error by the electronic device.

* * * * *